United States Patent
Mattina et al.

(10) Patent No.: US 7,539,141 B2
(45) Date of Patent: May 26, 2009

(54) METHOD AND APPARATUS FOR SYNCHRONOUS UNBUFFERED FLOW CONTROL OF PACKETS ON A RING INTERCONNECT

(75) Inventors: Matthew Mattina, Worcester, MA (US); George Z. Chrysos, Milford, MA (US); Stephen Felix, Westbury-on-Trym (GB)

(73) Assignee: Intel Corporation, Santa Clara, CA (US)

( * ) Notice: Subject to any disclaimer, the term of this patent is extended or adjusted under 35 U.S.C. 154(b) by 892 days.

(21) Appl. No.: 10/855,483

(22) Filed: May 28, 2004

(65) Prior Publication Data

US 2005/0276274 A1  Dec. 15, 2005

(51) Int. Cl.
 H04L 12/26  (2006.01)
 H04L 12/28  (2006.01)
(52) U.S. Cl. .................................. 370/235; 370/258
(58) Field of Classification Search ................ 370/229, 370/235, 254, 258, 403, 420
 See application file for complete search history.

(56) References Cited

U.S. PATENT DOCUMENTS

| | | | | |
|---|---|---|---|---|
| 5,748,900 A | * | 5/1998 | Scott et al. | 709/235 |
| 5,958,017 A | * | 9/1999 | Scott et al. | 709/235 |
| 6,738,379 B1 | * | 5/2004 | Balazinski et al. | 370/394 |
| 6,751,237 B2 | * | 6/2004 | van Oldenborgh et al. | 370/535 |
| 6,775,295 B1 | * | 8/2004 | Lothberg et al. | 370/465 |
| 7,103,008 B2 | * | 9/2006 | Greenblat et al. | 370/258 |
| 7,123,585 B2 | * | 10/2006 | Rashid et al. | 370/235 |
| 7,239,607 B1 | * | 7/2007 | Vijeh et al. | 370/230 |
| 2001/0021187 A1 | * | 9/2001 | Saeki et al. | 370/389 |
| 2003/0126233 A1 | * | 7/2003 | Bryers et al. | 709/219 |
| 2003/0167348 A1 | * | 9/2003 | Greenblat | 709/251 |
| 2004/0233845 A1 | * | 11/2004 | Jeong et al. | 370/230 |

OTHER PUBLICATIONS

Luiz Andre Barroso, et al., Impact of Chip-Level Integration on Performance of OLTP Workloads, Sixth International Symposium on High-Performance Computer Architecture (HPCA), Jan. 2000.

(Continued)

*Primary Examiner*—Hong Cho
(74) *Attorney, Agent, or Firm*—Kenyon & Kenyon LLP

(57) ABSTRACT

Embodiments of the present invention are related in general to data flow control in a network and in particular to synchronous packet flow control in a ring interconnect. An embodiment of a method may include rejecting an arriving packet at a destination node on a semiconductor chip's ring interconnect, e.g., an unbuffered, synchronous ring interconnect, if all of the destination node's buffers are not available, leaving the rejected packet on the ring interconnect to continue traversing the ring, and accepting the rejected packet upon arrival at the destination node, if a buffer is available. In an alternate embodiment, a method may include tracking the rejected packet as the rejected packet traverses the ring interconnect. An embodiment of an apparatus may include a semiconductor chip having a bidirectional ring interconnect and multiple nodes coupled to the bidirectional ring interconnect. Each node may have a buffer to store packets that arrive on the ring interconnect, if the buffer is available, and to reject packets that arrive, if the buffer is not available. These embodiments provide efficient flow control of packets on unbuffered, synchronous ring interconnects. Exemplary applications include chip multiprocessing.

37 Claims, 17 Drawing Sheets

OTHER PUBLICATIONS

Luiz Andre Barroso, et al., Piranha: A Scalable Architecture Based on Single-Chip Multiprocessing, In Proceedings of the 27th Annual International Symposium on Computer Architecture, Jun. 2000.
Motorola Architecture Guide C-5e/C-3e Network Processor Silicon Revision B0, Chapter 8: Internal Buses, Copyright 2003 Motorola, Inc.

Leonidas Georgiadis, et al., Throughput Properties of Fair Policies in Ring Networks, IEEE/ACM Transactions On Networking, vol. 1, No. 6, Dec. 1993.

* cited by examiner

METHOD AND APPARATUS FOR SYNCHRONOUS UNBUFFERED FLOW CONTROL OF PACKETS ON A RING INTERCONNECT

FIELD OF THE INVENTION

Embodiments of the present invention are related in general to data flow control in a network and in particular to synchronous packet flow control in a ring interconnect.

BACKGROUND

Flow control mechanisms in computer networks govern the transfer of packets from a source node to a destination node. Typical flow control mechanisms include negative-acknowledgment (NACK)/retry, drop/source-timeout/retry, credit/debit, and network buffering. Generally, a source node sends a packet to a destination node, where the destination node has a finite amount of "ingress buffering" for holding packets it has received from the source node prior to processing.

In NACK/retry flow control mechanisms, if the packet reaches the destination node and the destination node has no buffering available for the incoming packet, the packet is dropped and a NACK message is sent from the destination node back to the source node. The source node will then retry sending the packet at a later time.

However, a drawback of NACK/retry is that the source node must provide buffering for a sent packet because, until the source node receives an ACK (acknowledgment) or a NACK message, the source node does not know whether the destination node has a buffer available for holding the packet. Otherwise, if the destination node drops the packet and the source node has not preserved the packet in its own buffer, the packet is lost.

A larger drawback is the complexity introduced by the "retry" flow at the source node to resend the NACK'ed packets.

Still another drawback is that any design using NACK/retry must ensure that the NACK message is able to progress through the network back to the source node, even when the network is congested with sent packets. Additionally, the NACK message itself consumes valuable bandwidth that could be otherwise used for packets.

The drop/source-timeout/retry flow mechanism is similar to NACK/retry. The sent packet can be dropped and a response sent back to the source node when the destination node has no buffering. Additionally, in drop/source-timeout/retry, the sent packet can be dropped whenever there is too much network congestion. The source node will automatically retry sending a packet if the source node has not received a response from the destination node after some fixed time interval or timeout.

In addition to the drawbacks of NACK/retry, drop/source-timeout/retry has drawbacks regarding its timeout. The timeout may be either too long or too short. If the timeout is too long, when the destination node drops packets, the destination node must wait too long to receive a resent packet, thereby increasing system latency. On the other hand, if the timeout is too short, the likelihood of the source node unnecessarily sending the packet twice increases. As such, the system has to be able to cope with two (or more) instances of the same packet, resulting in increased complexity and hardware cost, as well as increased congestion.

In credit/debit flow mechanisms, the source node keeps track of the number of buffers available at the destination node through the use of "credits" and "debits." A source node will only send a packet to a destination node if the source node knows there is a free buffer available at the destination node to accept the packet. When the source node sends a packet to the destination node, the source node "debits" (decrements) a local count of the number of free buffers the destination node has available. When the destination node removes a packet from its incoming buffers, the destination node sends a "credit" message back to the source node, and the source node "credits" (increments) the local count of the number of free buffers the destination node has available.

The credit/debit mechanism requires a fixed partitioning of the destination node's incoming buffers among the n source nodes. If the destination node has a total of B incoming buffers, it may allocate B/n buffer entries to each source node. This works well if traffic to the destination node from all the source nodes is exactly uniform. But any deviation from uniform traffic will cause inefficiencies in the utilization of the B buffers. A degenerate form of this design is to provide enough buffering at every destination node for all possible packets. In other words, if each of the n source nodes can have P packets in-flight, then each destination node must have P*n buffer entries. The drawback with this mechanism is that it leads to an inefficient, area-hungry design because the buffer utilization is usually very low.

In a network buffering flow mechanism, the network itself provides buffering for packets that can not be accepted at the destination node. The network allows packets to "stall" in the network, causing packets traveling on the network behind a stalled packet to be blocked by the stalled packet. Alternatively, special route-around logic and buffering can be used to allow packets behind the stalled packet to route past the stalled packet.

While this type of design may be effective for certain topologies, it prevents packet delivery in others, e.g., ring topologies. In a ring topology, since the packets travel a circular route, stalling can completely block delivery of packets behind the stalled packet unless complex and hardware intensive route-around schemes are employed.

Accordingly, there is a need in the art to overcome the drawbacks of typical flow control mechanisms for packet transport, particularly in ring topologies.

DETAILED DESCRIPTION

Embodiments of the present invention may provide a method for controlling packet flow in an unbuffered, synchronous ring interconnect. In one embodiment, the method may include rejecting an arriving packet at a destination node on a semiconductor chip's ring interconnect, if the destination node's buffers are unavailable, leaving the rejected packet on the ring interconnect to continue to traverse the ring interconnect, and accepting the rejected packet upon arrival at the destination node, if one of the destination node's buffers is available. In an alternate embodiment, the method may also include tracking the rejected packet as the rejected packet traverses the ring interconnect and accepting the tracked packet, if the tracked packet arrives at the destination node during the expected time and a destination node buffer is available to accept the tracked packet.

Embodiments of the present invention may also provide a semiconductor chip including a ring interconnect and nodes coupled to the ring interconnect, where each node may include a buffer to store arriving packets, if the buffer is available, and to reject arriving packets, if the buffer is not available.

Embodiments of the present invention may advantageously provide efficient flow control of packets in a ring interconnect. In particular, these embodiments may avoid the complexity of the NACK/retry and drop/source-timeout/retry flow mechanisms, e.g., no retry flows or buffering of sent packets at the source node is necessary. These embodiments may also avoid the need for additional buffers required by the credit/debit flow mechanism and the hardwire complexity of route-around in the network buffering flow mechanism. These embodiments may be particularly helpful in on-chip ring interconnects for chip multiprocessing.

Figure 1:
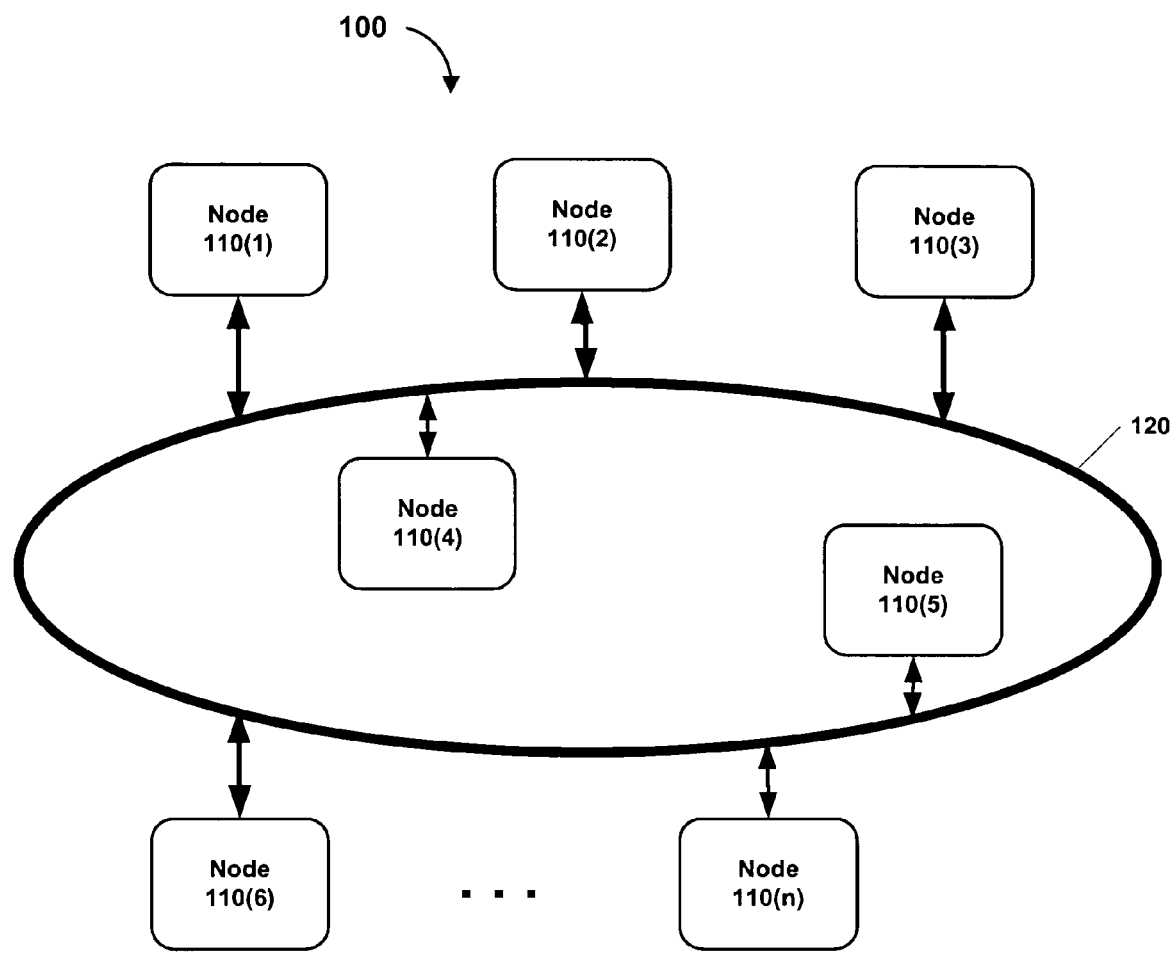
FIG. 1 is a semiconductor chip including multiple nodes coupled to a single ring interconnect, in accordance with an embodiment of the present invention.

FIG. 1 is a semiconductor chip including multiple nodes coupled to a bidirectional ring interconnect, in accordance with an embodiment to the present invention. Nodes 110(1) through 110(n) may be connected to bidirectional ring interconnect 120 at various access points or stops. Packets may travel between nodes 110(1) through 110(n) on interconnect 120 in either a clockwise or counterclockwise direction.

Nodes 110(1) through 110(n) may include a processor, cache bank, memory interface, global coherence engine interface, input/output interface, and any other such packet-handling component found on a semiconductor chip.

In FIG. 1, in an embodiment of the present invention, nodes 110(1) through 110(n) may be implemented as cache bank nodes by logically dividing a single large shared cache into subsets. Each cache bank node may include a portion of the address space in the single cache, and may independently service block requests (read, write, invalidate, etc) for the portion of the address space in the single cache. On interconnect 120, each cache bank node may have its own access point or stop.

In FIG. 1, interconnect 120 may include multiple unidirectional wires (not shown), where a first set of the unidirectional wires may transport packets in a clockwise direction and a second set may transport packets in a counterclockwise direction. Each set of unidirectional wires may have either a specific purpose (e.g., sending address commands) or a general purpose (e.g., supporting multiple packet types (address request, data, cache coherence protocol message, etc.)). Alternatively, each set of unidirectional wires may be designated to transport a single packet type.

Alternatively, in FIG. 1, interconnect 120 may include multiple bidirectional wires capable of transporting packets in both directions. In this alternate embodiment, the semiconductor chip may include switching logic to switch each wire to a desired direction to transport packets during a particular transaction.

Interconnect 120 may transport packets at various rates. For example, interconnect 120 may transport packets at a rate of one or more nodes per clock cycle or one node every two or more clock cycles. Many factors may determine the transport rate including the amount of traffic, the clock rate, the distance between nodes, etc. Generally, a node waits to inject a packet onto interconnect 120 until any packet already on interconnect 120 and at the node passes the node.

Figure 2:
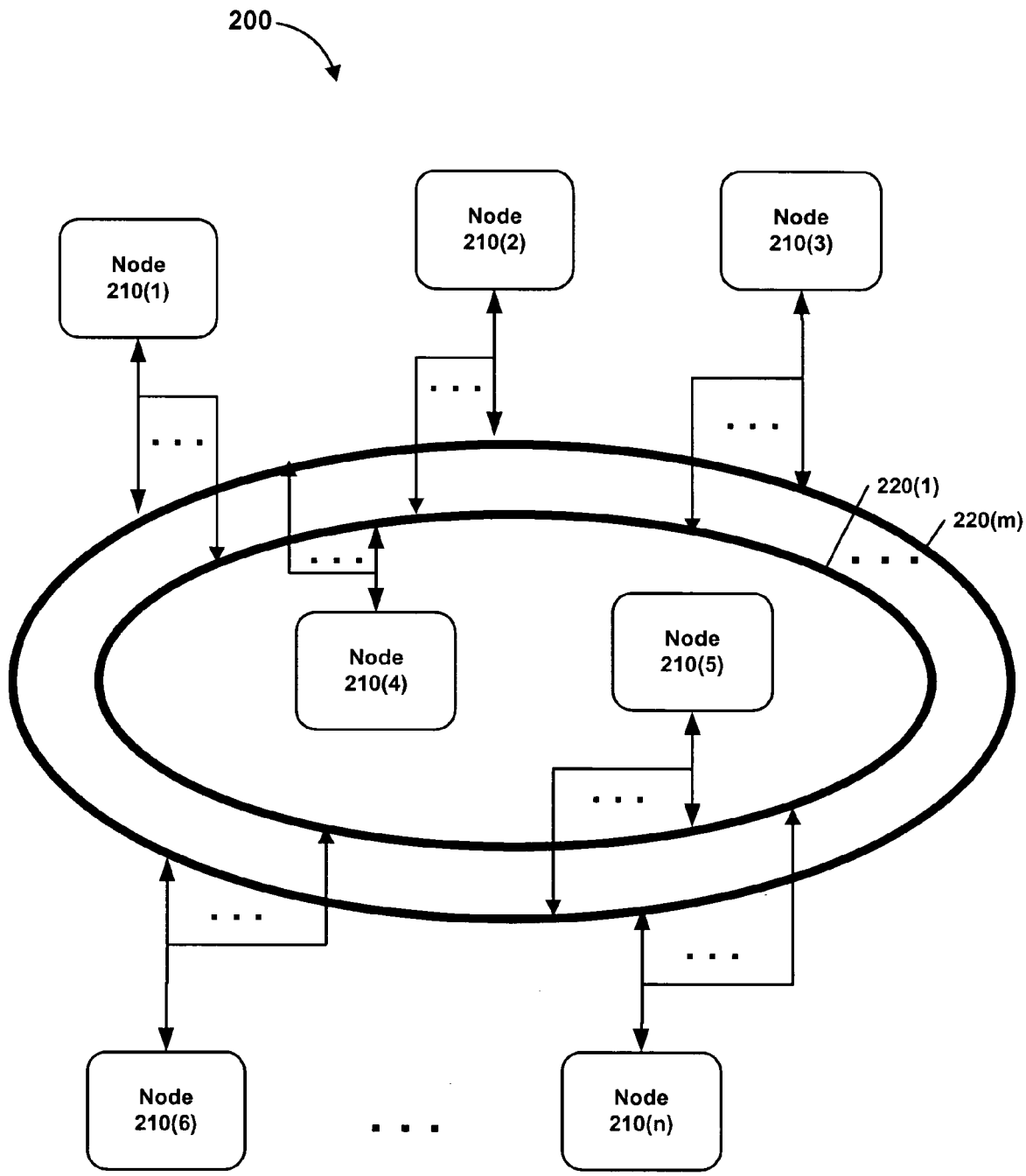
FIG. 2 is a semiconductor chip including multiple nodes coupled to multiple unidirectional and/or bidirectional ring interconnects, in accordance with an embodiment of the present invention.

FIG. 2 is a semiconductor chip including multiple nodes coupled to multiple ring interconnects, in accordance with an embodiment of the present invention. Nodes 210(1) through 210(n) may be connected to ring interconnects 220(1) through 220(m) at various access points or stops. Each node may select any of ring interconnects 220(1) through 220(m) on which to transport packets to another node.

In one embodiment, all the interconnects in FIG. 2 may be unidirectional, where some interconnects transport packets in only a clockwise direction and other interconnects transport packets in only a counterclockwise direction.

In an alternate embodiment, some interconnects in FIG. 2 may be unidirectional and others bidirectional. In this alternate embodiment, some of the unidirectional interconnects may transport packets in only a clockwise direction and others may transport packets in only a counterclockwise direction. The bidirectional interconnects may transport packets in both directions, consistent with the operation of the bidirectional interconnect of FIG. 1.

Figure 3:
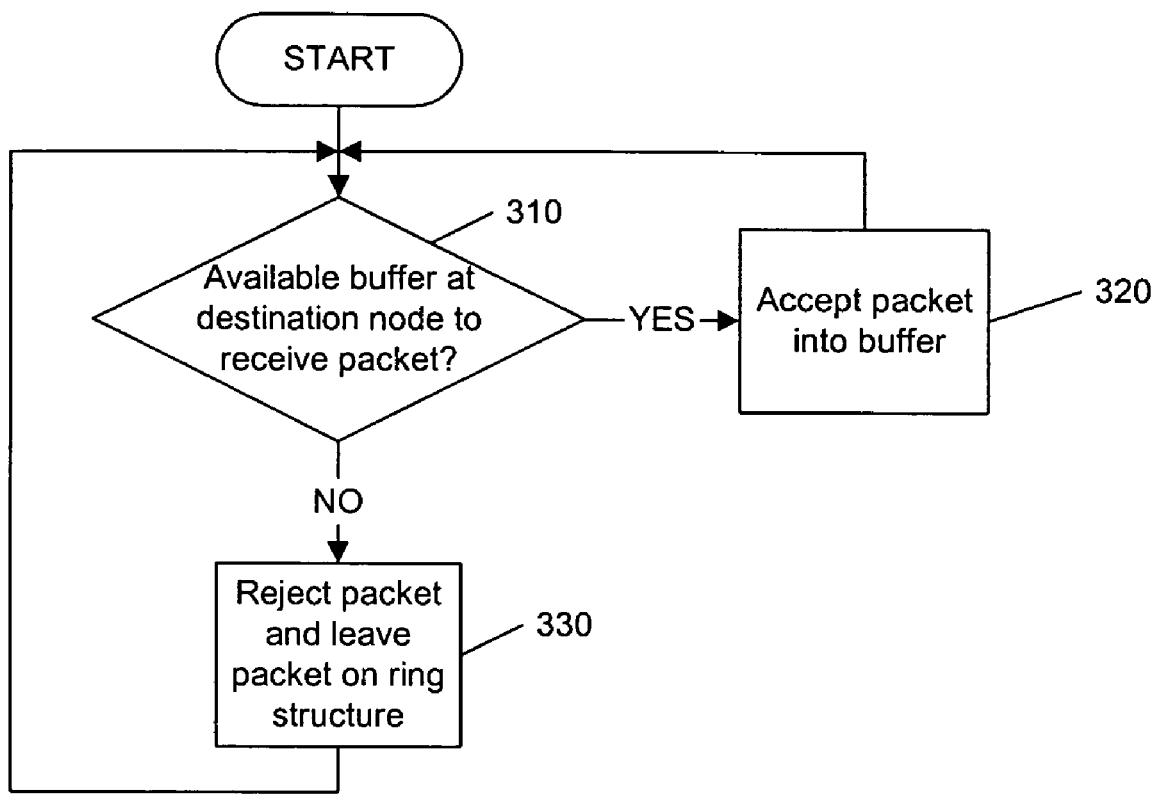
FIG. 3 is a flowchart of a flow control method according to an embodiment of the present invention.

FIG. 3 is a flowchart of a flow control method according to an embodiment of the present invention. In FIG. 3, packets on a ring interconnect, for example, an unbuffered, synchronous ring interconnect, may advance on the ring interconnect every cycle, such that there is no buffering or stalling once a packet is on the ring interconnect. The ring interconnect may be thought of as a series of ring slots in which packets advance around the ring interconnect.

According to one embodiment, when a packet arrives at a destination node in a ring slot on a ring interconnect, the destination node may determine (310) whether there is an available buffer at the destination node to receive the packet. If there is an available buffer, the destination node may accept (320) the packet into the available buffer, which removes the packet from the ring slot. If no buffers are available, the destination node may reject (330) the packet and leave the rejected packet in the ring slot on the ring interconnect to continue to traverse the ring interconnect until the rejected packet may return to the destination node, so that the destination node may again determine (310) whether there is an available buffer at the destination node and the method may continue as described above.

During the time the rejected packet traverses the ring interconnect, a buffer at the destination node may become available. In this case, when the rejected packet again arrives at the destination node, the destination node may accept (320) the packet. On the other hand, if the rejected packet arrives at the destination node and the buffers are still unavailable, the destination node may again reject (330) the packet and leave the twice rejected packet on the ring interconnect to again continue to traverse the ring interconnect until a buffer is available at the destination node.

FIGS. 4-7 illustrate the operation of the flow control method of FIG. 3 in a ring interconnect according to an embodiment of the present invention. In this example, ring interconnect 430 may include ring slots 420(1) through 420(8) to transport packets around ring interconnect 430. Each ring slot may be coupled to a system clock signal line 440 to synchronize transport of ring slots during clock cycles. Ring interconnect 430 may be coupled to nodes 410(1) through 410(8). Each node may have an access point or stop on ring interconnect 430 through which the node may inject packets into or accept packets from ring slots 420(1) through 420(8). Each node may inject or accept packets at an adjacent ring slot. In this example, ring interconnect 430 may be a single unidirectional ring interconnect to transport packets in a clockwise direction. However, embodiments of the present invention are not limited to a particular type of ring interconnect or packet transport direction.

Figure 4:
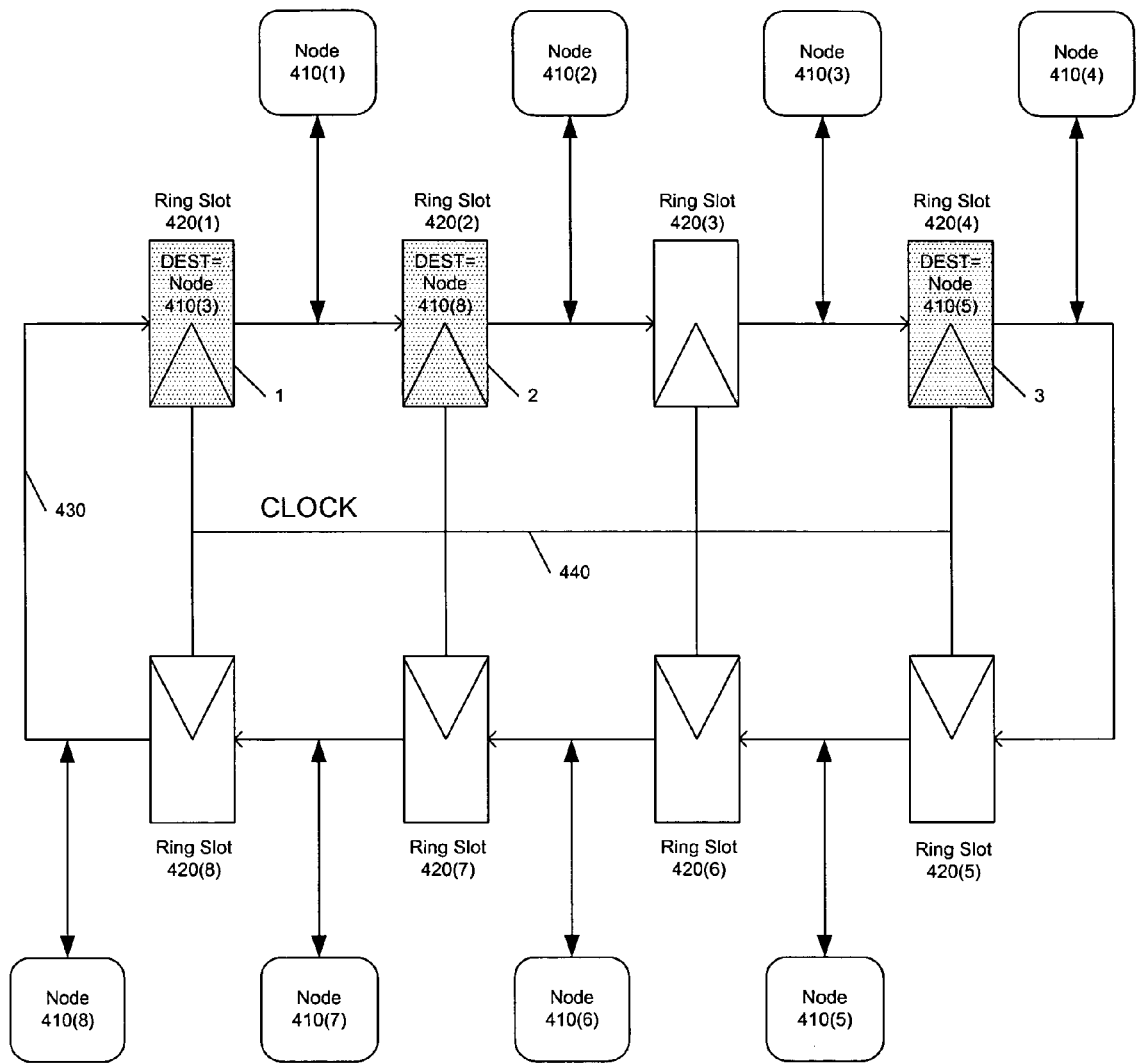
FIGS. 4-7 illustrate the operation of the flow control method of FIG. 3 in a ring interconnect according to an embodiment of the present invention.

In FIG. 4, three packets may be on ring interconnect 430 at clock cycle C. Beginning on the left, packet 1 may be in ring slot 420(1) with a destination specified to be node 410(3). Packet 2 may be in ring slot 420(2) with a destination specified to be node 410(8). Packet 3 may be in ring slot 420(4) with a destination specified to be node 410(5). The remaining ring slots in ring interconnect 430 may be either occupied or unoccupied. However, for ease of illustration, only the above-described ring slots are occupied.

Figure 5:
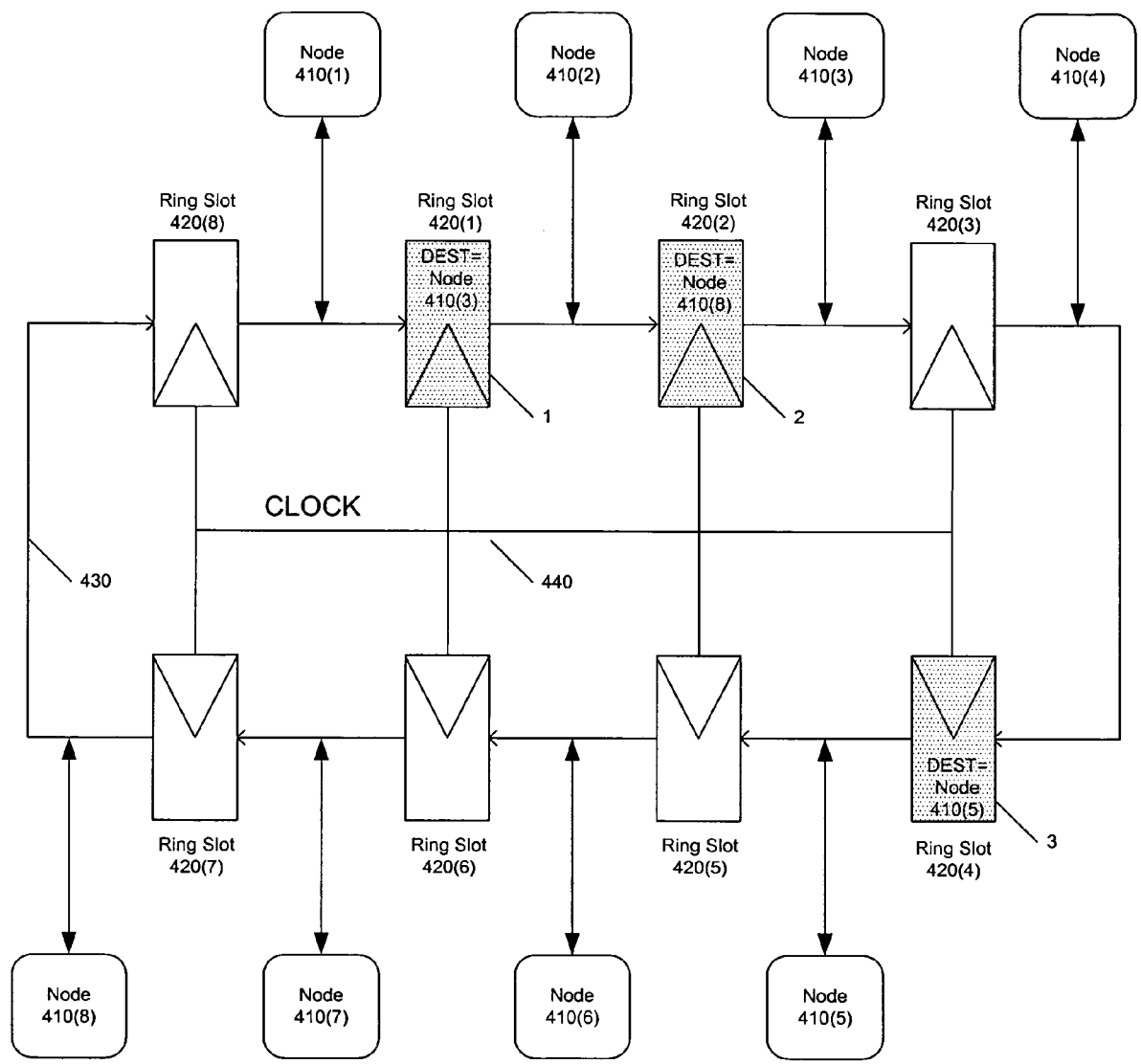

FIG. 5 shows the state of ring interconnect 430 at the next clock cycle, cycle C+1. Each packet has advanced in its ring slot clockwise during clock cycle C. Packet 3 has reached its destination node, node 410(5). Therefore, according to an embodiment of the present invention, if node 410(5) determines (310) that it has an available buffer, node 410(5) may accept (320) packet 3 into its buffer in the next clock cycle. Otherwise, if node 410(5) determines (310) that it does not have an available buffer, packet 3 may be rejected (330) packet 3 to advance on ring interconnect 430.

Figure 6:
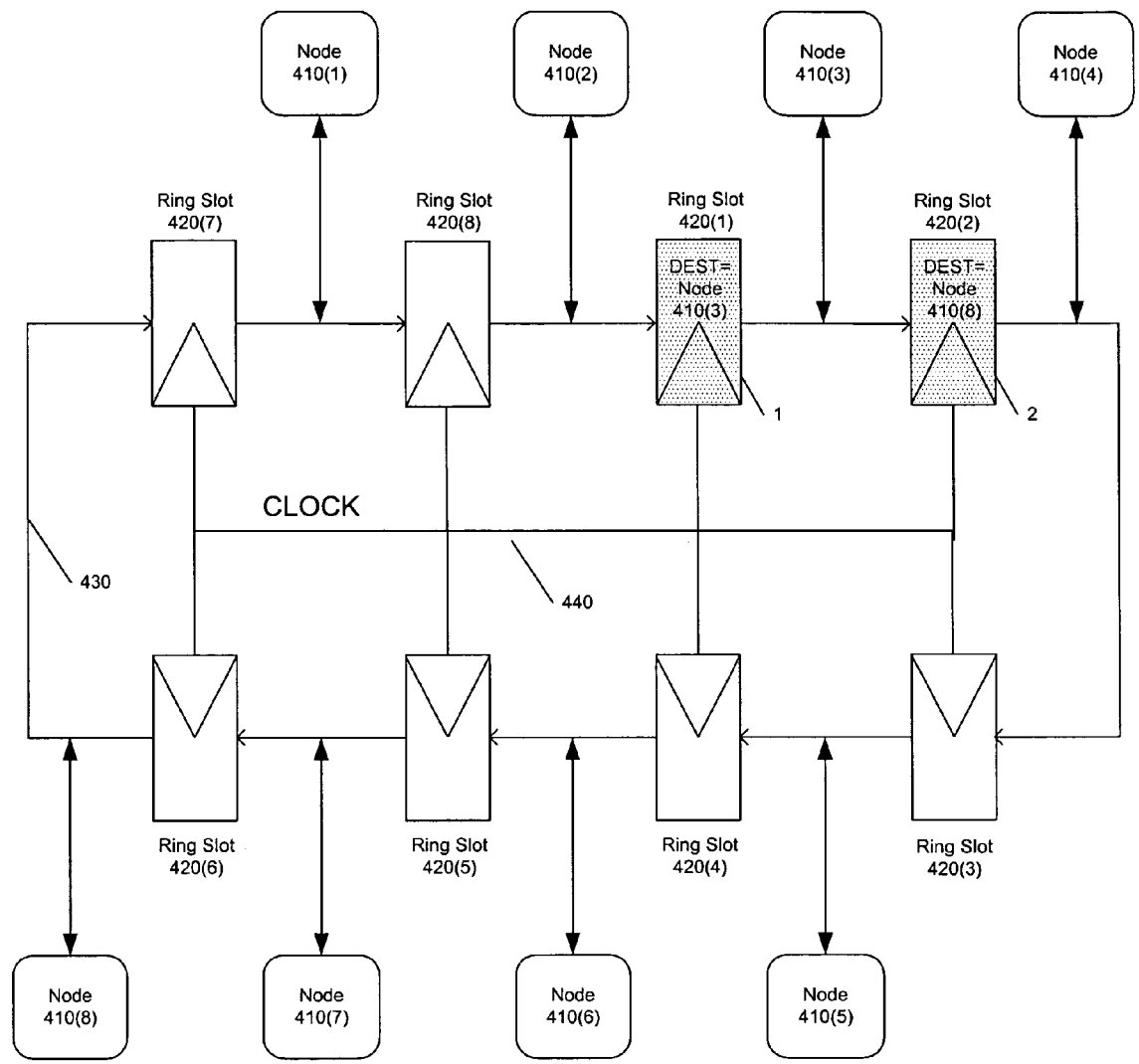

FIG. 6 shows the state of ring interconnect 430 at the third clock cycle, cycle C+2. Since node 410(5) had an available buffer, packet 3 was accepted (320) at node 410(5). The remaining packets have advanced in their ring slots clockwise. Packet 1 has reached its destination node, node 410(3). Therefore, if node 410(3) determines (310) that it has an available buffer, node 410(3) may accept (320) packet 1 into its buffer during this clock cycle C+2. Otherwise, if node 410(3) determine (310) that it does not have an available buffer, packet 1 may be rejected (330) to advance on ring interconnect 430.

Figure 7:
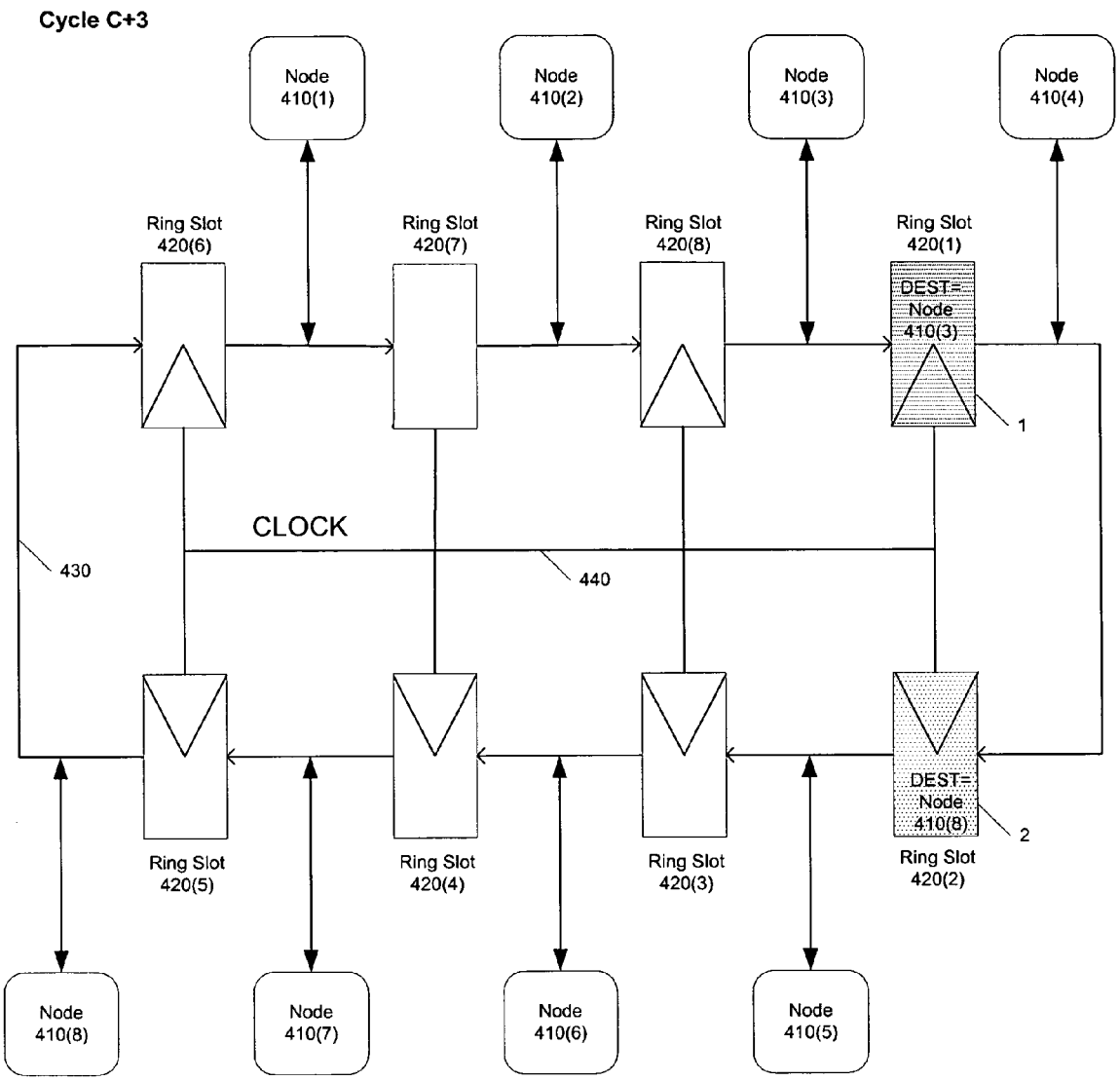

FIG. 7 shows the state of ring interconnect 430 at the fourth clock cycle, cycle C+3. In this case, node 410(3) determined (310) that it did not have any available buffers. As a result, packet 1 was rejected (330) and left on ring interconnect 430. Packet 1 has advanced in its ring slot past node 410(3) and may continue to traverse ring interconnect 430 until a buffer is available at node 410(3) to accept (320) packet 1 when packet 1 returns to node 410(3).

It is to be understood that the example is for illustration purposes only and is not intended to limit the configuration to that shown. The ring interconnect may include one or more ring structures capable of transporting packets in unidirectional or bidirectional directions. Additionally, the number of ring slots need not equal the number of nodes. More than one ring slot may be positioned between two nodes at any time. Conversely, more than one node may be positioned between two ring slots at any time. The packet transport rate need not be limited to one node per clock cycle, but may comprise multiple nodes per clock cycle or one node per multiple clock cycles, depending on the application.

It is further to be understood that the condition for acceptance or rejection of a packet is not limited to the availability of a buffer, but may comprise any condition for rejecting packets. In an alternate embodiment, for example, a destination node may reject every n-th packet that arrives, where n may be a randomly generated number.

In FIG. 3, to avoid a rejected packet traversing the ring interconnect indefinitely while other packets closer to the destination node are accepted when a buffer becomes available (i.e., starvation), additional control may be provided. For example, a method of tracking rejected packets may ensure that an available buffer at the destination node is saved for the rejected packet.

Figure 8:
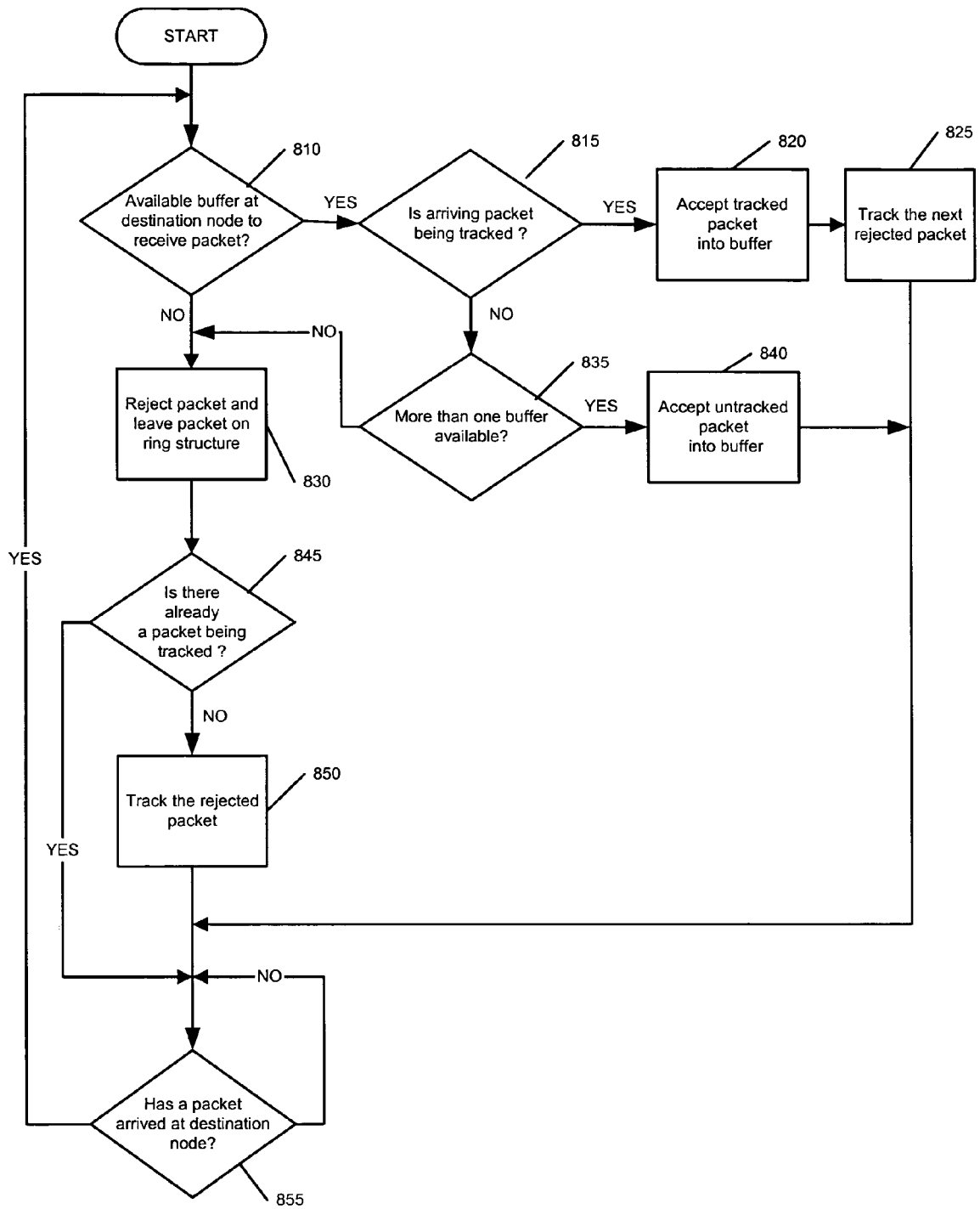
FIG. 8 is a flowchart of a flow control method according to an alternate embodiment of the present invention.

FIG. 8 is a flowchart of a flow control method of an alternate embodiment of the present invention. In FIG. 8, the method may include tracking of rejected packets on a ring interconnect, for example, an unbuffered, synchronous ring interconnect, to ensure that all rejected packets are accepted in a timely manner. When a packet arrives at a destination node on a ring interconnect, the destination node may determine (810) whether it has an available buffer to receive the packet.

In FIG. 8, if the destination node determines (810) that it has no available buffers for an arriving packet, the destination node may reject (830) the packet and leave the rejected packet on the ring interconnect to traverse the interconnect. The destination node may determine (845) whether a packet is currently being tracked. If the destination node is determined (845) not to be currently tracking a packet, the destination node may track (850) the just-rejected packet. Otherwise, if the destination node is determined (845) to be currently tracking a packet, the destination node may leave the rejected packet on the ring interconnect untracked. Tracking mechanisms that may be used by the destination node are described below.

The destination node may await (855) arrival of another packet. If the destination node determines (855) that another packet has arrived at the destination node, the destination node may determine (810) whether it has an available buffer for the arriving packet.

In FIG. 8, if the destination node determines (810) that it has an available buffer, the destination node may determine (815) whether the arriving packet is currently being tracked. If the destination node determines (815) that the arriving packet is being tracked, the destination node may accept (820) the tracked packet into the available buffer and track (825) the destination node's next rejected packet, using any of the tracking mechanisms described below. The destination node may await (855) arrival of the newly tracked packet or another packet.

In FIG. 8, if the arriving packet is determined (815) not to be the packet being tracked, the destination node may determine (835) whether more than one destination node buffer is available. If more than one buffer is determined (835) to be available, the untracked packet may be accepted (840) into one of the available buffers and another available buffer saved for the tracked packet. The destination node may await (855) arrival of the tracked packet or another packet. Otherwise, if only one buffer is determined (835) to be available, the untracked packet may be rejected (830) and left on the ring interconnect and the one available buffer saved for the tracked packet.

This method ensures that at least one available buffer is reserved for the tracked packet, but allows untracked packets to be accepted if additional buffers are available. As such, a rejected packet may be assured of acceptance at the destination node when buffer space is limited. Additionally, other packets may be accepted when buffer space is not limited to keep the ring interconnect free for subsequent injected packets.

Tracking may comprise calculating a cycle count at which a rejected packet may be expected to return to the destination node after traversing the ring interconnect. The cycle count may equal the actual clock cycle when the destination node rejects the packet plus the number of clock cycles for the packet to traverse the ring interconnect. For example, if a destination node rejects a packet at clock cycle C and it takes D clock cycles for a packet to traverse the ring interconnect, then the cycle count may equal C+D. Therefore, if a buffer is available, the destination node may accept, as the tracked rejected packet, the packet that arrives at clock cycle C+D. If more than one buffer is available, the destination node may accept packets that arrive at other clock cycles, but may ensure that one of the available buffers is reserved for the packet arriving at clock cycle C+D.

Alternatively, tracking may comprise setting a data byte in the packet to represent an identification number of the destination node. For example, if a destination node with an identification number N rejects a packet, a data byte in the rejected packet may be set to N. All other data packets destined for this node may have the data byte set to 0. Therefore, if a buffer is available, the destination node may accept a packet with the data byte set to N. If more than one buffer is available, the destination node may accept packets that arrive with the data byte unset, but may ensure that one of the available buffers is reserved for the packet with the data byte set to N.

Alternatively, the destination node may track all of its rejected packets and accept the rejected packets in the order that they were rejected. For example, if a destination node with an identification number N rejects a packet, a data byte in the rejected packet may be set to N1 to indicate that it was the first packet rejected by the destination node. The destination node may set the data byte in the second rejected packet to N2 and so on. The destination node may set a variable to the lowest identification number currently rejected, in this case, N1. When a buffer is available, the destination node may accept the N1 packet when it arrives and set the variable to N2, the next lowest identification number. If more than one buffer is available, the destination node may accept packets that arrive even if they have higher identification numbers, but may ensure that one of the available buffers is reserved for the packet with the lowest identification number.

It is to be understood that tracking is not limited to the mechanisms described herein, but may include any suitable mechanism for tracking a packet in a network. For example, a tracking tag or a tracking flag may be used to identify and track a rejected packet.

FIGS. 9-16 illustrate the operation of the flow control method of FIG. 8 in a ring interconnect according to an embodiment of the present invention. The configuration is the same as discussed regarding FIGS. 4-7.

Figure 9:
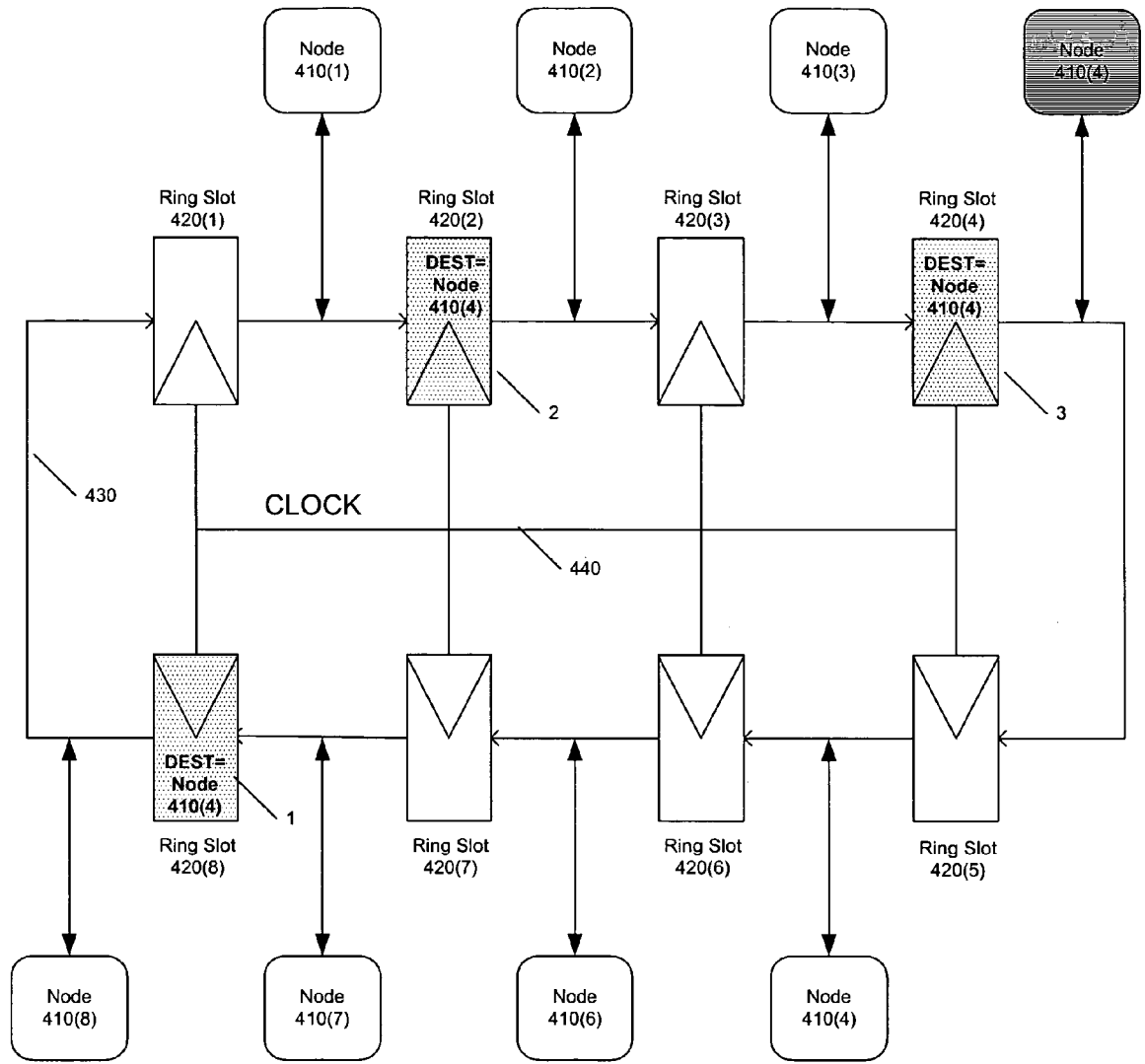
FIGS. 9-16 illustrate the operation of the flow control method of FIG. 8 in a ring interconnect according to an alternate embodiment of the present invention.

In FIG. 9, three packets may be on ring interconnect 430 at clock cycle C. Beginning on the left, packet 1 may be in ring slot 420(8), packet 2 in ring slot 420(2), and packet 3 in ring slot 420(4). All the packets may have a destination specified to be node 410(4). The remaining ring slots may be either unoccupied or occupied. However, for ease of illustration, only the above-described ring slots are occupied. In FIG. 9, packet 3 has reached its destination node, node 410(4). Therefore, according to an embodiment of the present invention, if node 410(4) determines (810) that it has an available buffer, node 410(4) may accept packet 3 during this clock cycle C. Otherwise, if node 410(4) determines (810) that it does not have an available buffer, packet 3 may be rejected (830) and advance on ring interconnect 430. If node 410(4) determines (845) that it is not currently tracking a packet, node 410(4) may track (850) packet 3. If node 410(4) determines (845) that it is currently tracking a packet, packet 3 may not be left on ring interconnect 430 untracked.

Figure 10:
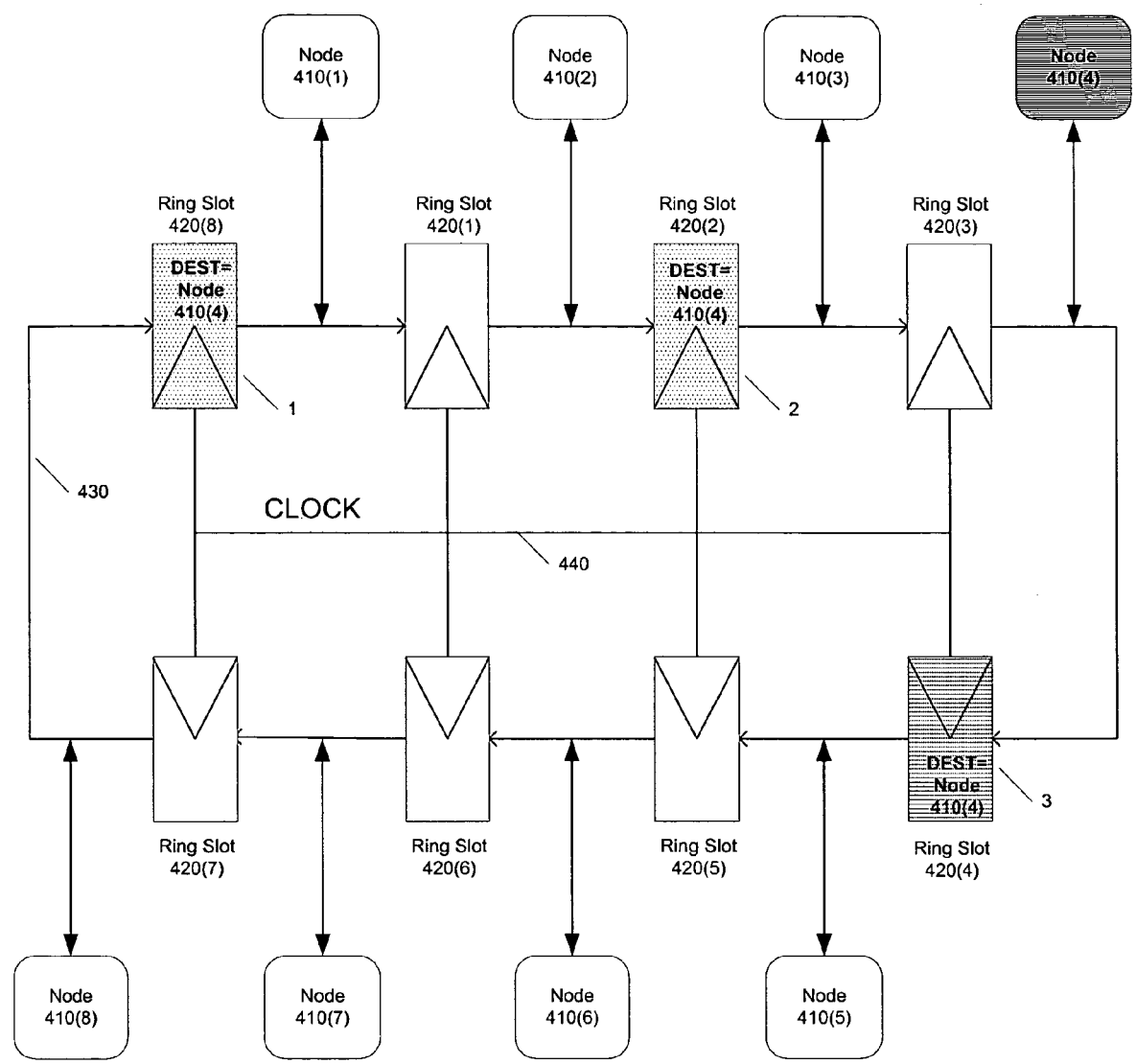

FIG. 10 shows the state of ring interconnect 430 at the next clock cycle, cycle C+1. In this case, node 410(4) determined (810) that it did not have an available buffer and rejected (830) packet 3. Since node 410(4) determined (845) that packet 3 was the first packet rejected by node 410(4), node 410(4) may track (850) packet 3 as packet 3 continues to traverse ring interconnect 430, according to the tracking mechanisms of the present invention. Packets 1 and 2 have advanced in their ring slots clockwise.

Figure 11:
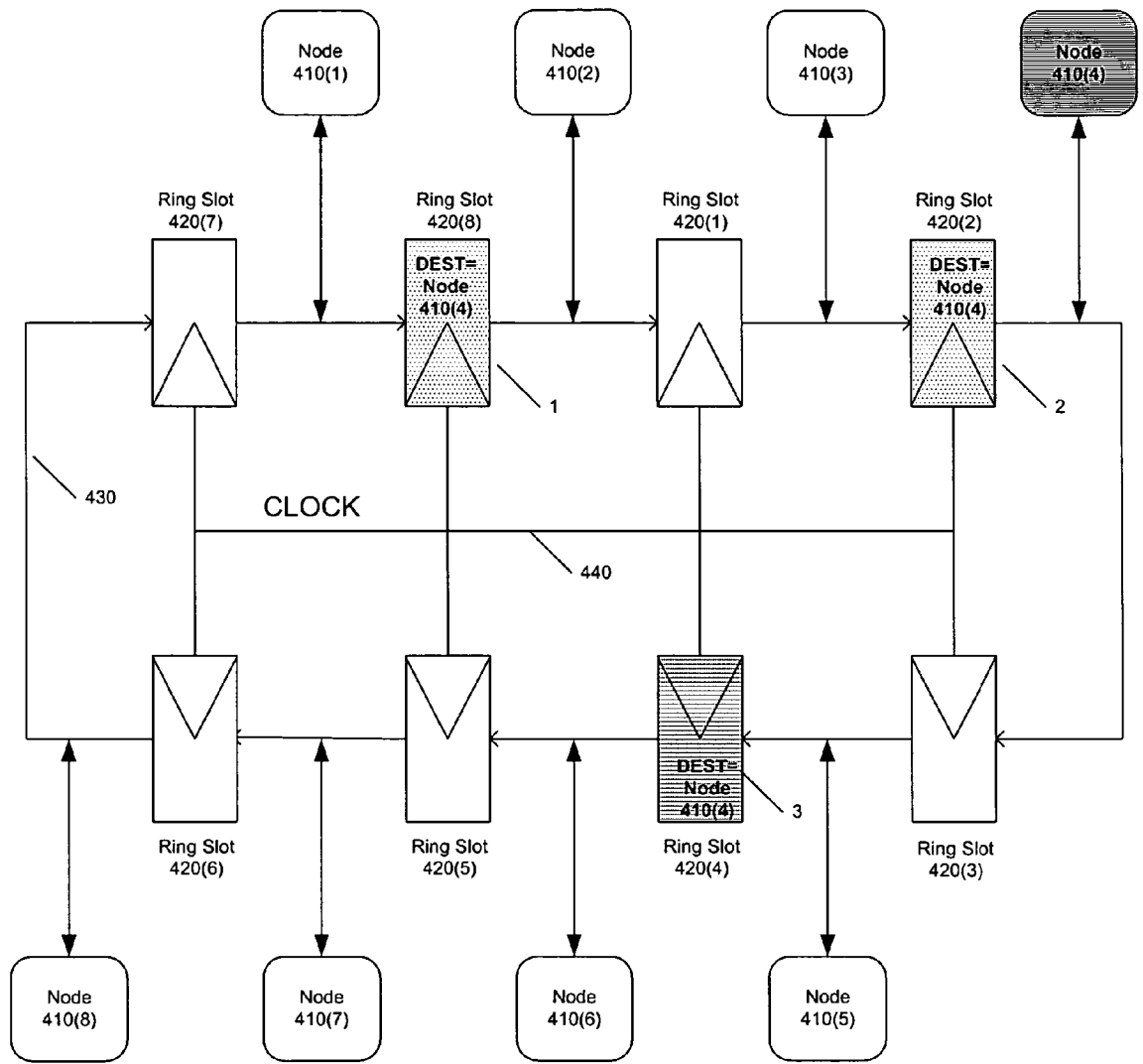

FIG. 11 shows the state of ring interconnect 430 at the next clock cycle, cycle C+2. Packet 2 has reached its destination node, node 410(4). Suppose during the previous clock cycle C+1, node 410(4) has determined (810) that it has one available buffer. However, according to an embodiment of the present invention, node 410(4) may determine (815) if packet 2 is the tracked packet. In this case, node 410(4) may determine (815) that packet 2 is not the tracked packet and further determine (835) that only one buffer is available. Node 410(4) may reject (830) packet 2 and leave packet 2 on ring interconnect 430. Node 410(4) may determine (845) that it is currently tracking packet 3. As a result, node 410(4) may leave rejected packet 2 on ring interconnect 430 untracked.

Figure 12:
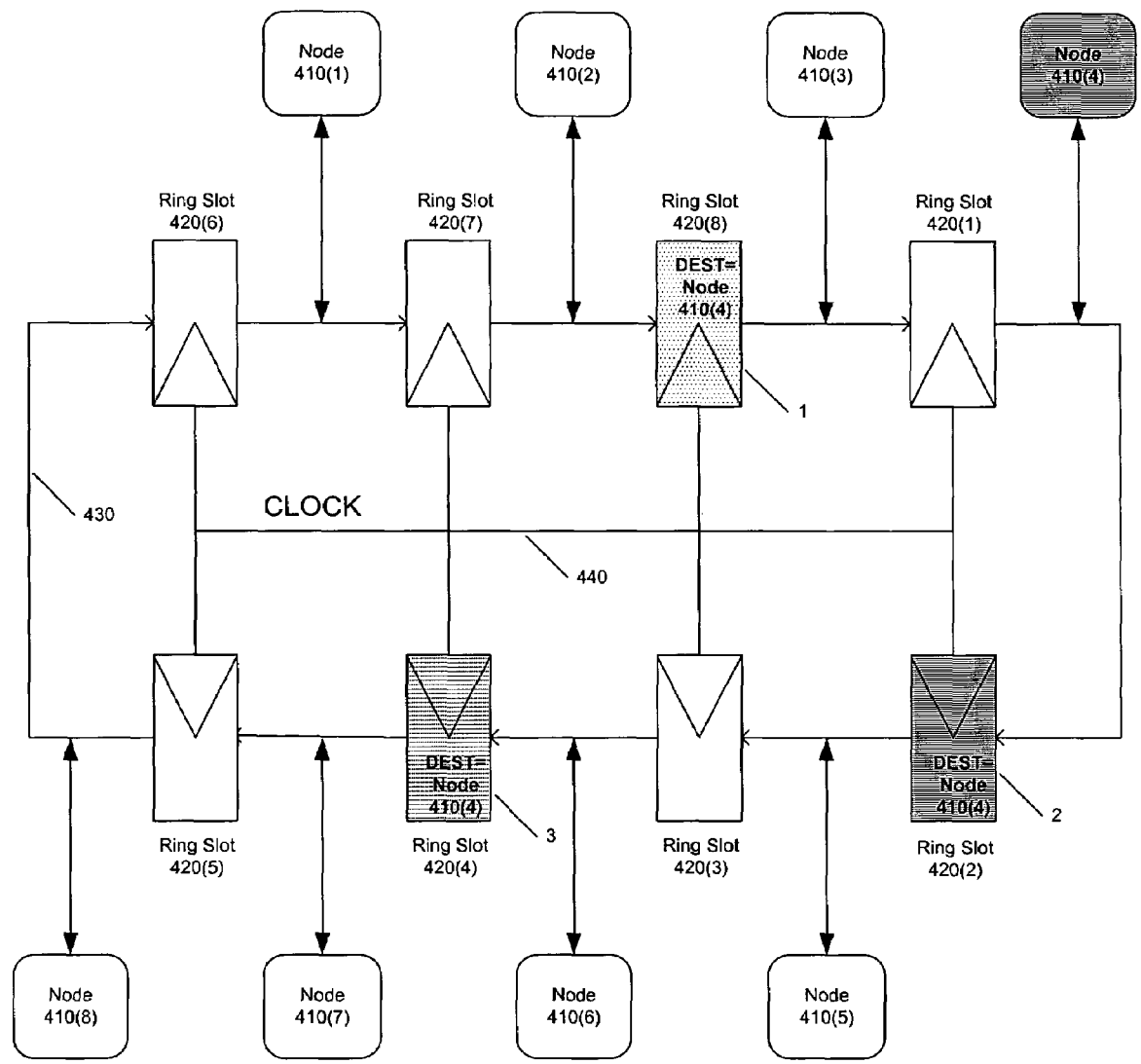

FIG. 12 shows the state of ring interconnect 430 at the next clock cycle, cycle C+3. As described above, packet 2 has been rejected (830), but is not tracked (845) since packet 3 is already being tracked. Node 410(4) may await (855) arrival of packet 1, 2, or 3. Node 410(4) still has one available buffer since it rejected packet 2.

Figure 13:
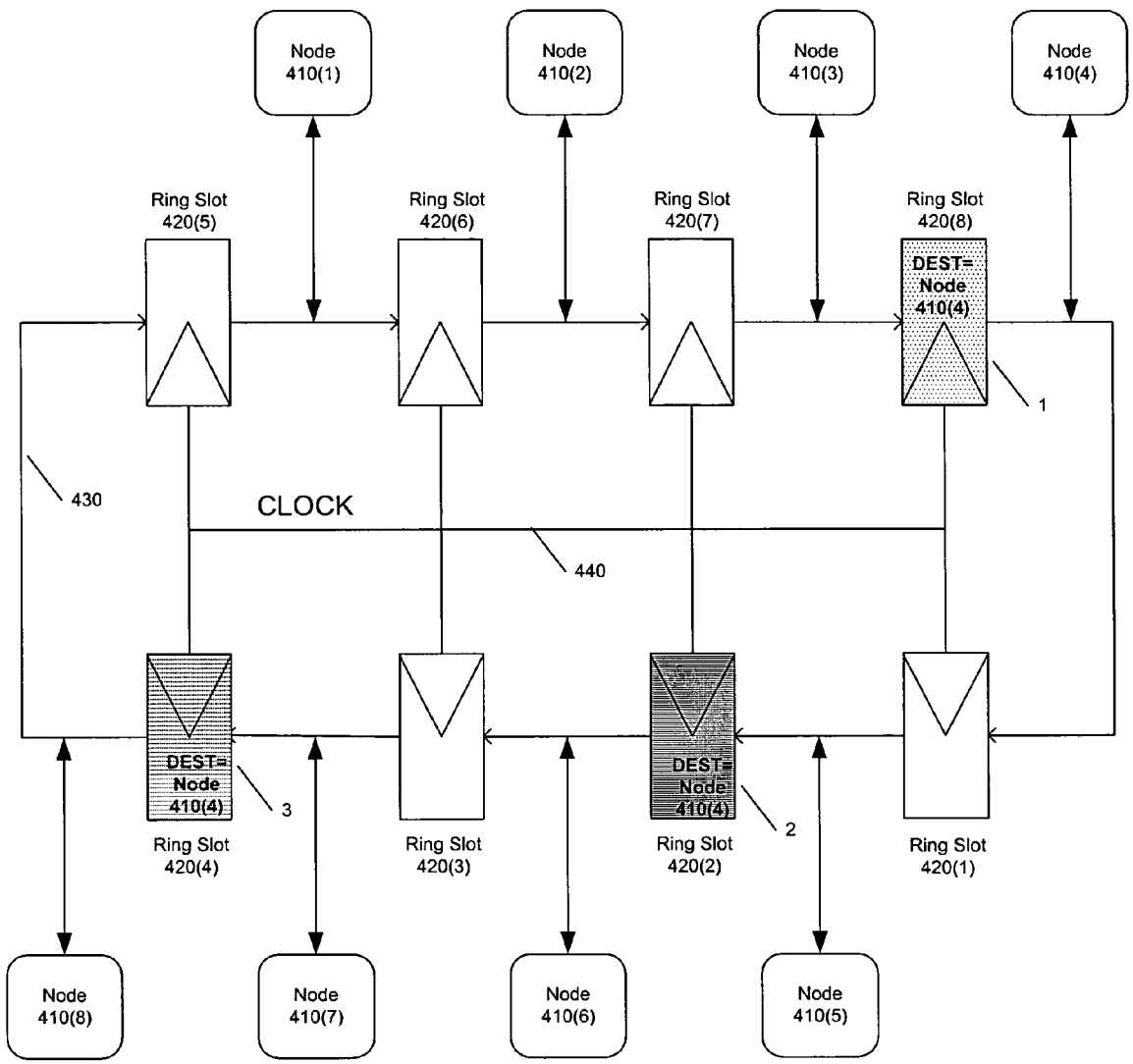

FIG. 13 shows the state of ring interconnect 430 at the next clock cycle, cycle C+4. Packet 1 has reached its destination node, node 410(4). Suppose during the previous clock cycle C+3, node 410(4) determined (810) that it has a second available buffer. Node 410(4) may now have two available buffers. Therefore, according to an embodiment of the present invention, node 410(4) may determine (815) whether arriving packet 1 is being tracked. Since packet 1 is not being tracked (packet 3 is), node 410(4) may determine (835) whether it has more than one buffer available. Since node 410(4) has determined (835) that it has two buffers available, node 410(4) may accept (840) packet 1 and save the available buffer for tracked packet 3 when it arrives.

Figure 14:
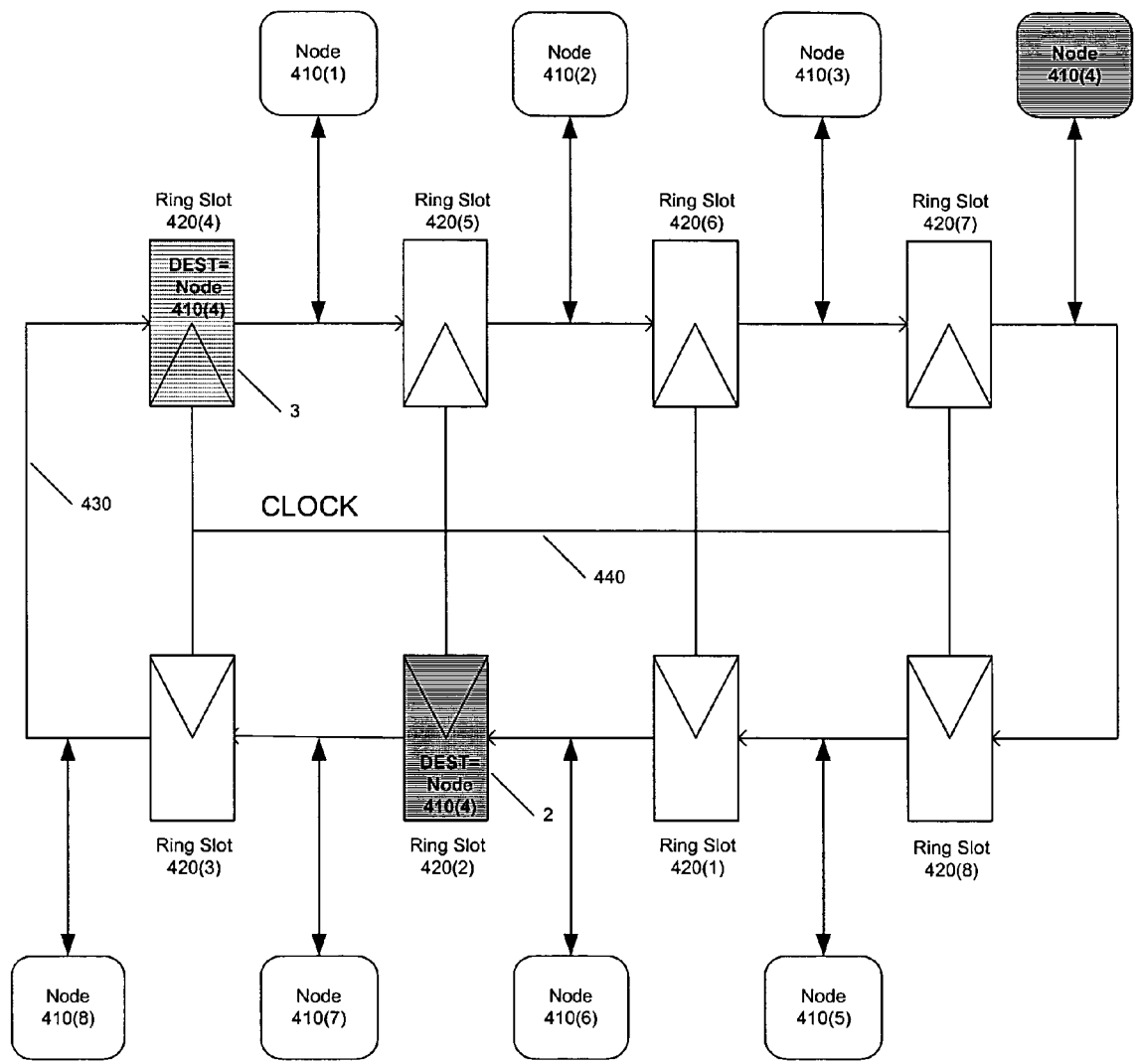

FIG. 14 shows the state of ring interconnect 430 at the next clock cycle C+5. Packet 1 has been accepted (840) at node 410(4) and node 410(4) now has one buffer available. Tracked packet 3 and untracked packet 2 may continue to traverse ring interconnect 430 clockwise.

Figure 15:
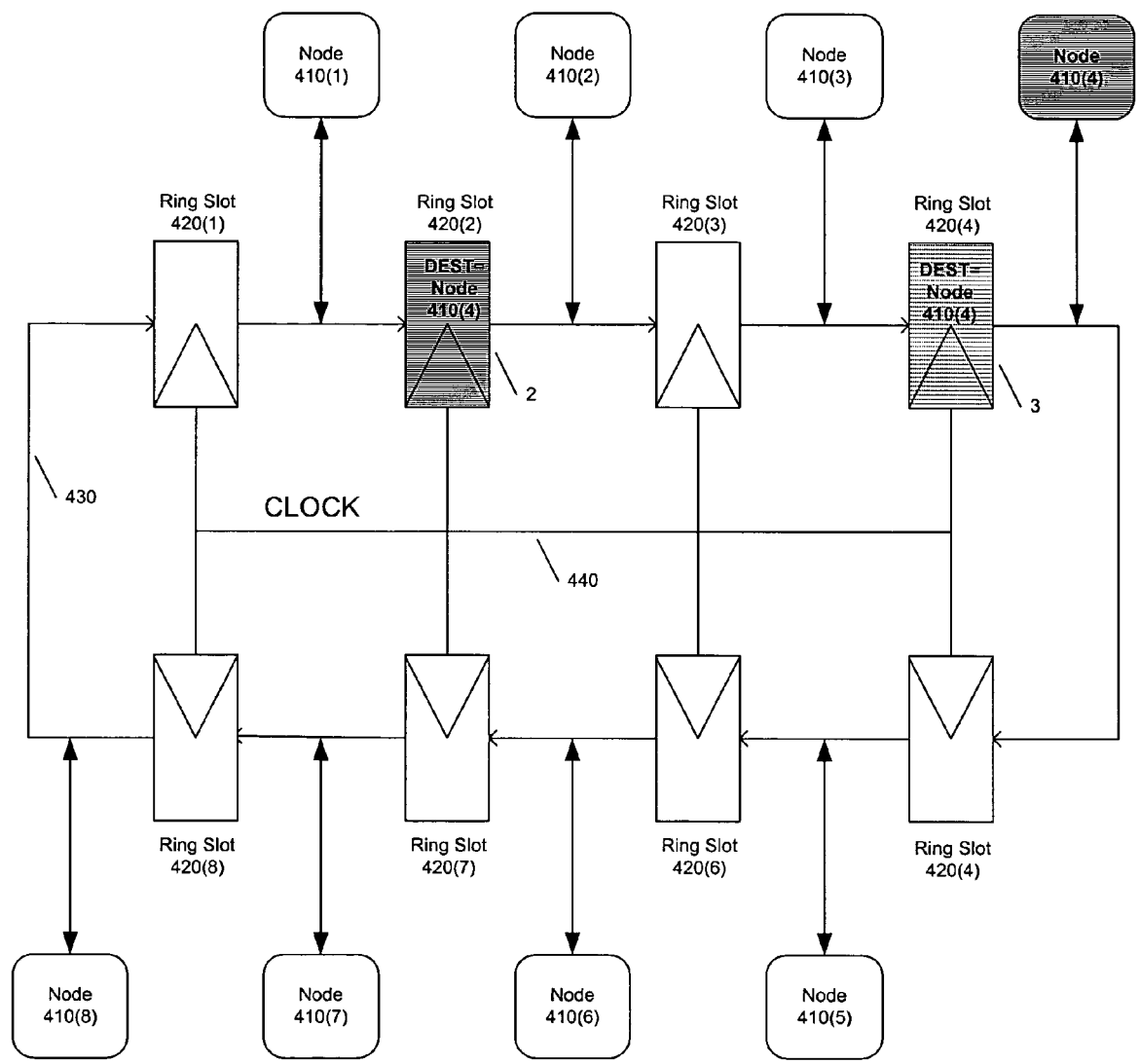

Packets 2 and 3 may continue to traverse ring interconnect 430 until, at clock cycle C+8, packet 3 may again arrive (855) at its destination node, node 410(4), as shown in FIG. 15. In this case, node 410(4) has one buffer available. Hence, according to an embodiment of the present invention, node 410(4) may determine (810) that it has one available buffer and determine (815) that arriving packet 3 is being tracked. Node 410(4) may accept (820) tracked packet 3 into the available buffer.

Figure 16:
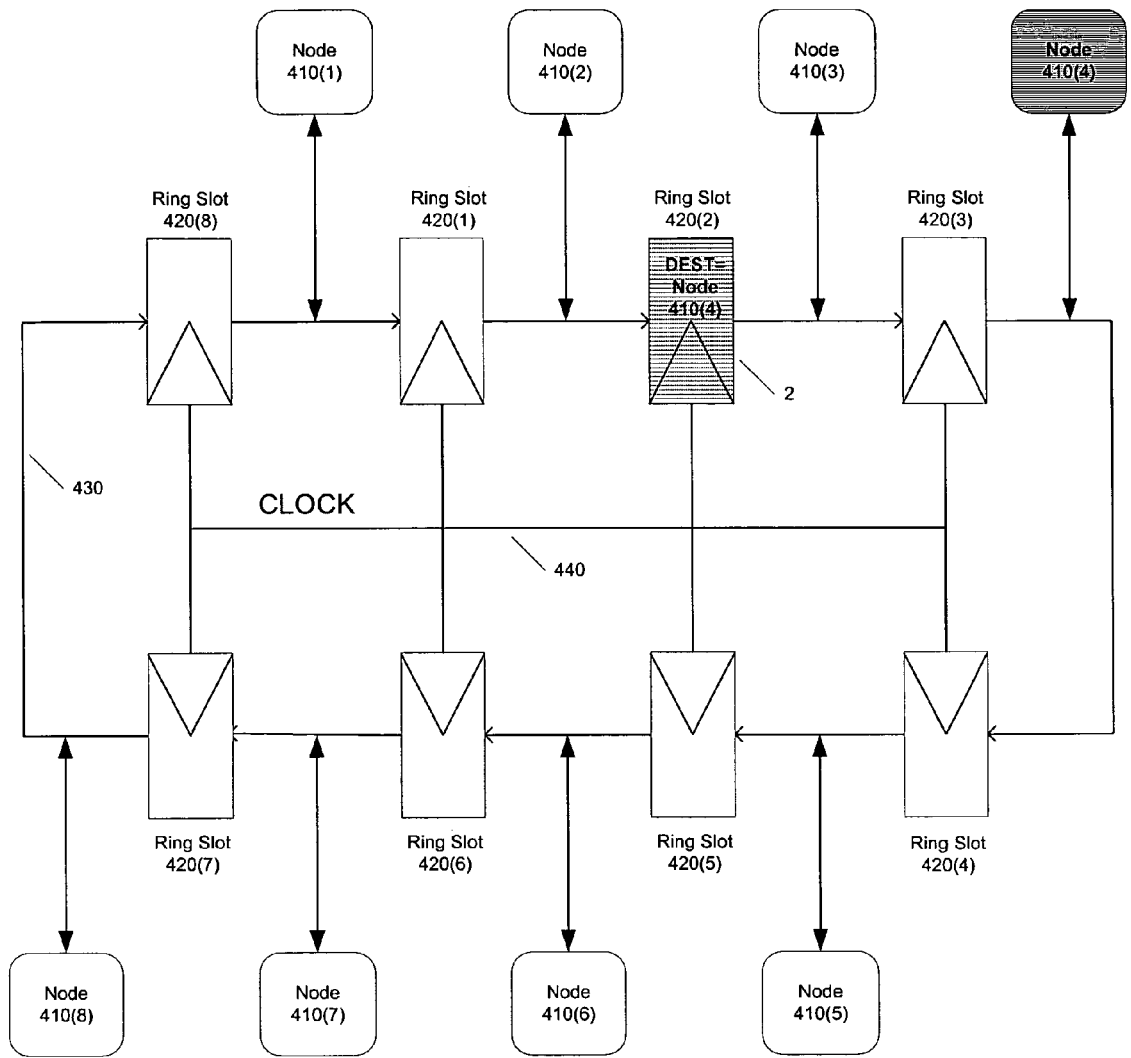

FIG. 16 shows the state of ring interconnect 430 at the next clock cycle C+9. Packet 3 has been accepted (820) into the last available buffer at node 410(4). Packet 2 may be tracked (825) until accepted by node 410(4). If node 410(4) determines (810) that it does not have an available buffer when packet 2 arrives, node 410(4) may again reject (830) packet 2 and continues to track packet 2.

Embodiments of a semiconductor chip as in FIG. 1 may implement a method according to an embodiment of the present invention. In one embodiment, semiconductor chip 110 may include ring interconnect 120 and nodes 110(1) through 110(n) coupled to ring interconnect 120. Each node may have at least one buffer to store packets, if the buffer is available when the packets arrive on ring interconnect 120, and to reject the packets, if the buffer is not available. Each node may also include an adder (not shown) to calculate the cycle count for tracking a rejected packet.

Alternatively, each node may include a programmable finite state machine (not shown) to be programmed to calculate the cycle count for tracking the rejected packet. Each node may alternatively include a processor (not shown) to calculate the cycle count.

Similarly, embodiments of a semiconductor chip as in FIG. 2 may implement a method according to an embodiment of the present invention.

Embodiments of the present invention may be coupled to a system including other semiconductor chips via a communication bus. The bus may transport packets according to embodiments of the present invention when the packets arrive or leave the chips. In one embodiment, the bus may transport rejected packets from the chips if the rejected packets are not accepted after a certain time period, e.g., after traversing nodes on the chip's ring interconnect multiple times or after a number of clock cycles has elapsed.

Figure 17:
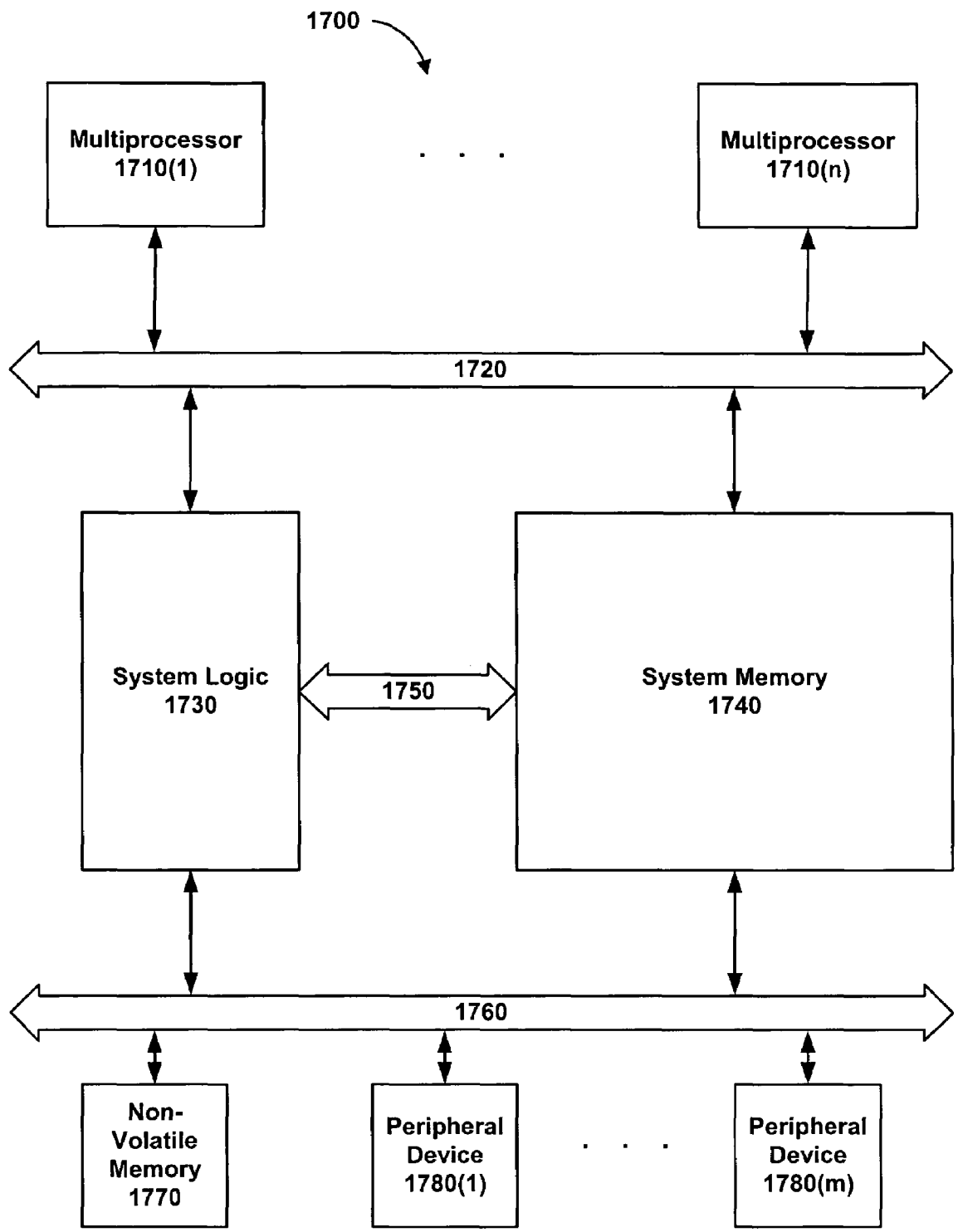
FIG. 17 is a block diagram of a computer system for implementing an embodiment of the present invention.

FIG. 17 is a block diagram of a computer system, which may include an architectural state, including one or more multiprocessors and memory for use in accordance with an embodiment of the present invention. In FIG. 17, a computer system 1700 may include one or more multiprocessors 1710(1)-1710(n) coupled to a processor bus 1720, which may be coupled to a system logic 1730. Each of the one or more multiprocessors 1710(1)-1710(n) may be N-bit processors and may include a decoder (not shown) and one or more N-bit registers (not shown). In accordance with an embodiment of the present invention, each of the one or more multiprocessors 1710(1)-1710(n) may include a bidirectional and/or unidirectional ring interconnect (not shown) to couple to the N-bit processors, the decoder, and the one or more N-bit registers.

System logic 1730 may be coupled to a system memory 1740 through a bus 1750 and coupled to a non-volatile memory 1770 and one or more peripheral devices 1780(1)-1780(m) through a peripheral bus 1760. Peripheral bus 1760 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 1770 may be a static memory device such as a read only memory (ROM) or a flash memory. Peripheral devices 1780(1)-1780(m) may include, for example, a keyboard; a mouse or other pointing devices; mass storage devices such as hard disk drives, compact disc (CD) drives, optical disks, and digital video disc (DVD) drives; displays and the like.

Embodiments of the present invention may be implemented using any type of computer, such as a general-purpose microprocessor, programmed according to the teachings of the embodiments. The embodiments of the present invention thus also includes a machine readable medium, which may include instructions used to program a processor to perform a method according to the embodiments of the present invention. This medium may include, but is not limited to, any type of disk including floppy disk, optical disk, and CD-ROMs.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
   rejecting a packet upon arrival at a destination node on a ring structure on a semiconductor chip, if all of a plurality of buffers at the destination node are unavailable;
   tracking the rejected packet;
   leaving the rejected packet on the ring structure to continue to traverse the ring structure for future delivery of the rejected packet based on the tracking; and
   accepting the rejected packet upon arrival at the destination node, if one of the plurality of buffers is available.

2. The method of claim 1, wherein the tracking comprises:
   calculating a cycle count for the rejected packet to return to the destination node, wherein the cycle count equals a current clock cycle plus the number of clock cycles for the rejected packet to traverse the ring structure and return to the destination node.

3. The method of claim 2, wherein the accepting comprises:
   accepting the rejected packet if the cycle count equals an actual clock cycle upon arrival of the rejected packet at the destination node.

4. The method of claim 1, wherein the tracking comprises:
   setting a data byte in the rejected packet to represent an identification number of the destination node.

5. The method of claim 4, wherein the tracking further comprises incrementing the data byte each time the destination node rejects the rejected packet.

6. The method of claim 5, wherein the accepting comprises:
   accepting the rejected packet if the data byte corresponds to the identification number of the destination node.

7. The method of claim 1, further comprising:
   tracking a next rejected packet after the rejected packet is accepted into the available one of the plurality of buffers.

8. The method of claim 1, further comprising:
   if at least two of the plurality of buffers is available,
      accepting an unrejected packet or a subsequently rejected packet prior to accepting the rejected packet, and
      reserving one of the at least two buffers to accept the rejected packet.

9. The method of claim 1, further comprising:
   rejecting and not tracking a previously unrejected packet or another previously rejected packet prior to accepting the rejected packet, if only one of the plurality of buffers is available.

10. The method of claim 1, wherein the leaving comprises:
    leaving the rejected packet on the ring structure to traverse the ring structure at least once before accepting the rejected packet.

11. The method of claim 1, wherein the leaving comprises: leaving the rejected packet on the ring structure to traverse at least one node of the ring structure per clock cycle.

12. The method of claim 1, wherein the leaving comprises: leaving the rejected packet on the ring structure to traverse one node of the ring structure during a plurality of clock cycles.

13. A method comprising:
rejecting an arriving packet at a destination node on a ring structure on a semiconductor chip if a first condition exists;
tracking the rejected packet;
leaving the rejected packet on the ring structure to traverse the ring structure for future delivery of the rejected packet based on the tracking; and
accepting the rejected packet at the destination node upon the return of the rejected packet at the destination node, if a second condition exists.

14. The method of claim 13, wherein the first condition is an unavailable buffer and the second condition is an available buffer.

15. The method of claim 13, wherein the first condition is the number of the arriving packet equals a random number and the second condition is the number of the arriving packet does not equal the random number.

16. The method of claim 13, wherein the tracking comprises:
associating an identification number with the rejected packet;
incrementing the identification number; and
associating the incremented identification number with a next rejected packet.

17. The method of claim 16, wherein the accepting comprises:
accepting the rejected packet with a lowest identification number among all rejected packets; and
upon accepting the rejected packet, resetting the lowest identification number to be the next lowest identification number.

18. A semiconductor chip comprising:
a bidirectional ring structure, the bidirectional ring structure comprising a plurality of ring slots coupled to a system clock signal line, the system clock signal line providing a clock signal to the bidirectional ring structure; and
a plurality of nodes coupled to the bidirectional ring structure, each node having a buffer to store a packet that arrives at the node on the bidirectional ring structure, if the buffer is available, and to reject the packet and track the rejected packet, if the buffer is unavailable, wherein the rejected packet is delivered in future based on the tracking.

19. The semiconductor chip of claim 18, wherein each node is further to leave the rejected packet on the bidirectional ring structure until the buffer is available.

20. The semiconductor chip of claim 18, wherein each node comprises:
an adder to calculate a cycle count for the rejected packet to return to the node, wherein the node is to track the rejected packet according to the cycle count.

21. The semiconductor chip of claim 18, wherein each node comprises:
a programmable finite state machine to calculate a cycle count for the rejected packet to return to the node, wherein the node is to track the rejected packet according to the cycle count.

22. The semiconductor chip of claim 18, wherein each node comprises:
a processor to calculate a cycle count for the rejected packet to return to the node, wherein the node is to track the rejected packet according to the cycle count.

23. A system comprising:
a multiprocessor chip comprising
a plurality of nodes, each node comprising a processor and having a buffer to store packets, and
at least one bidirectional ring structure coupled to the nodes, the at least one bidirectional ring structure comprising a plurality of ring slots coupled to a system clock signal line, the system clock signal line providing a clock signal to the bidirectional ring structure, wherein the processor is to:
determine whether the buffer of the node is available to receive a packet from the at least one bidirectional ring structure,
reject the packet and let the rejected packet traverse the at least one bidirectional ring structure, if the buffer is unavailable, and
track the rejected packet for future delivery of the rejected packet based on the tracking; and
a bus coupled to the multiprocessor chip.

24. The system of claim 23, wherein the processor is further to:
compute a tracking tag for the rejected packet, and
accept the rejected packet having the tracking tag upon the return of the rejected packet to the node, if the buffer is available.

25. The system of claim 24, wherein the tracking tag comprises a cycle count that equals a current clock cycle plus the number of clock cycles for the rejected packet to traverse the at least one bidirectional ring structure and return to the node.

26. The system of claim 24, wherein the tracking tag comprises an identification number corresponding to the node.

27. The system of claim 23, wherein each node comprises one of a processor, a cache bank, a memory interface, an adder, a programmable finite state machine, and an input/output port.

28. The system of claim 23, wherein a buffer is unavailable if the buffer is full.

29. The system of claim 23, wherein, after a period of time that a buffer is unavailable, the bus is to transport any packets destined for the buffer from the multiprocessor chip.

30. The system of claim 29, wherein the period of time is 2n clock cycles, where n is the number of nodes.

31. A computer readable medium having embodied thereon a computer program, said computer program being executable by a machine to perform a method comprising:
rejecting a packet upon arrival at a destination node on a ring structure on a semiconductor chip, if all of a plurality of buffers at the destination node are unavailable;
tracking the rejected packet;
leaving the rejected packet on the ring structure to continue to traverse the ring structure for future delivery of the rejected packet based on the tracking; and
accepting the rejected packet upon arrival at the destination node, if one of the plurality of buffers is available.

32. The computer readable medium of claim 31, the method further comprising:
tracking a next rejected packet after the rejected packet is accepted into the available one of the plurality of buffers.

33. The computer readable medium of claim 31, the method further comprising:

if at least two of the plurality of buffers is available, accepting an unrejected packet or a subsequently rejected packet prior to accepting the rejected packet, and reserving one of the at least two buffers to accept the rejected packet.

34. The computer readable medium of claim 31, the method further comprising:

rejecting and not tracking a previously unrejected packet or another previously rejected packet prior to accepting the rejected packet if only one of the plurality of buffers is available.

35. A computer readable medium having embodied thereon a computer program, said computer program being executable by a machine to perform a method comprising:

rejecting an arriving packet at a destination node on a ring structure on a semiconductor chip, if a first condition exists;

tracking the rejected packet;

leaving the rejected packet on the ring structure to traverse the ring structure for future delivery of the rejected packet based on the tracking; and accepting the rejected packet at the destination node upon the return of the rejected packet at the destination node, if a second condition exists.

36. The computer readable medium of claim 35, wherein the first condition is an unavailable buffer and the second condition is an available buffer.

37. The computer readable medium of claim 35, wherein the first condition is the number of the arriving packet equals a random number and the second condition is the number of the arriving packet does not equal the random number.

* * * * *